United States Patent
Opperman

(10) Patent No.: US 7,498,548 B2
(45) Date of Patent: Mar. 3, 2009

(54) MICROWAVE HEATING SYSTEM AND METHOD FOR REMOVING VOLATILES FROM ADSORBENT MATERIALS

(75) Inventor: Stephen H. Opperman, Ludington, MI (US)

(73) Assignee: Ranger Research, Inc., Ludington, MI (US)

(*) Notice: Subject to any disclaimer, the term of this patent is extended or adjusted under 35 U.S.C. 154(b) by 0 days.

(21) Appl. No.: 11/742,945

(22) Filed: May 1, 2007

(65) Prior Publication Data

US 2007/0257029 A1 Nov. 8, 2007

Related U.S. Application Data

(60) Provisional application No. 60/797,348, filed on May 2, 2006.

(51) Int. Cl.
H05B 6/72 (2006.01)
F26B 3/34 (2006.01)

(52) U.S. Cl. ............... 219/695; 219/746; 219/750; 219/756; 219/762; 34/259

(58) Field of Classification Search ......... 219/690–697, 219/746–750, 756, 762; 34/259, 262–265
See application file for complete search history.

(56) References Cited

U.S. PATENT DOCUMENTS

| | | | |
|---|---|---|---|
| 2,746,375 A | 5/1956 | Abbott et al. |
| 3,265,780 A | 8/1966 | Long |
| 3,384,038 A | 5/1968 | Fenet |
| 4,023,279 A | 5/1977 | Janda |
| 4,144,654 A | 3/1979 | Barr |
| 4,208,806 A | 6/1980 | Manser et al. |
| 4,312,640 A | 1/1982 | Verrando |
| 4,312,641 A | 1/1982 | Verrando et al. |
| 4,322,394 A | 3/1982 | Mezey et al. |
| 4,347,670 A | 9/1982 | Wear et al. |
| 4,406,937 A | 9/1983 | Soulier |
| 4,622,448 A | 11/1986 | Awata et al. |
| 4,778,970 A | 10/1988 | Klaila |
| 4,937,418 A | 6/1990 | Boulard |
| 4,967,486 A | 11/1990 | Doelling |
| 5,162,275 A | 11/1992 | Wilson et al. |
| 5,282,886 A | 2/1994 | Kobayashi et al. |
| 5,367,174 A | 11/1994 | Bazile et al. |
| 5,389,335 A | 2/1995 | Charm et al. |

(Continued)

OTHER PUBLICATIONS http://www.microwaves101.com/encyclopedia/absorbingradar3. cfm, Feb. 27, 2006, pp. 1-11.

*Primary Examiner*—Philip H Leung
(74) *Attorney, Agent, or Firm*—Harness, Dickey & Pierce, P.L.C.

(57) ABSTRACT

A heating apparatus for removing volatiles from a saturated adsorbent is provided. The heating apparatus can include a vessel including a first end and a second end. The vessel can be adapted to receive the saturated adsorbent. The heating apparatus can also include a channel in communication with the first end of the vessel and a radiation source that provides energy to heat the vessel. The heating apparatus can further comprise a lateral waveguide coupled to the radiation source and disposed within the channel to transmit the energy from the radiation source to the vessel to heat the saturated adsorbent disposed within the vessel.

19 Claims, 1 Drawing Sheet

U.S. PATENT DOCUMENTS

Figure 1:
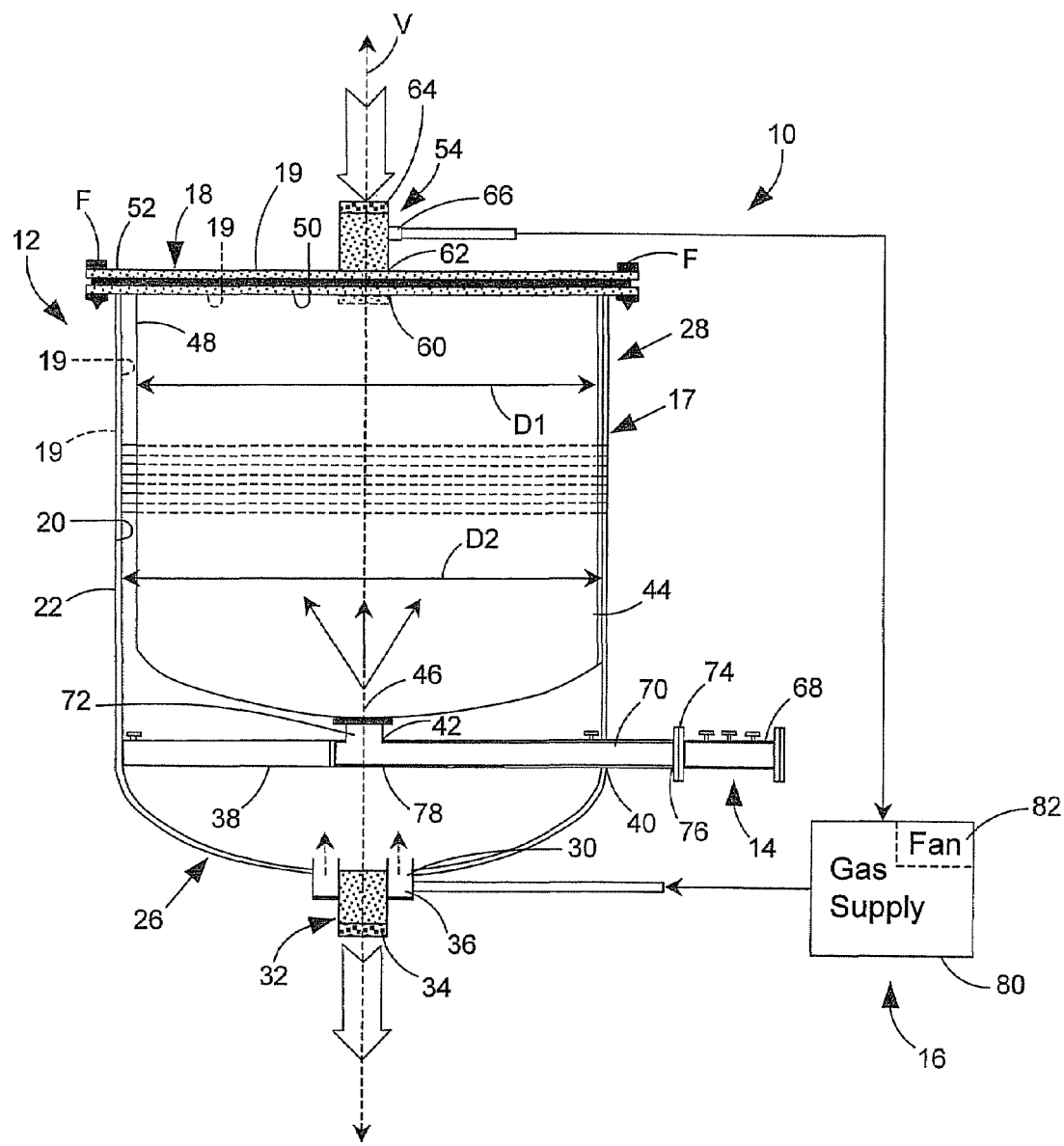

| | | |
|---|---|---|
| 5,449,889 A | 9/1995 | Samardzija |
| 5,509,956 A | 4/1996 | Opperman et al. |
| 5,523,514 A | 6/1996 | Cauquil et al. |
| 5,532,462 A * | 7/1996 | Butwell et al. ............... 219/695 |
| 5,539,673 A | 7/1996 | Charm et al. |
| 5,545,804 A | 8/1996 | Archambeault et al. |
| 5,830,328 A | 11/1998 | Uhm |
| 6,054,700 A * | 4/2000 | Rokhvarger et al. ......... 219/759 |
| 6,112,602 A | 9/2000 | Mitra |
| 6,112,903 A | 9/2000 | Kimmel et al. |
| 6,477,905 B1 | 11/2002 | Mitra |

* cited by examiner

MICROWAVE HEATING SYSTEM AND METHOD FOR REMOVING VOLATILES FROM ADSORBENT MATERIALS

CROSS-REFERENCE TO RELATED APPLICATIONS

This application claims the benefit of U.S. Provisional Application No. 60/797,348 filed on May 2, 2006. The disclosure of the above application is incorporated herein by reference.

INTRODUCTION

The present disclosure relates generally to volatile treatment systems, and more particularly to a microwave heating system and method for removing volatiles from adsorbent materials.

Gas phase adsorption is, for the most part, a process whereby minor vapor constituents within a given gas stream are collected by an adsorptive solid phase material. This process is generally applied when gas purification is desirable, and/or beneficial. The adsorptive material generally includes pores that extend from an outer surface inward. The chemical structures of an adsorbent and its characteristic pore size generally determine the type and size of vapor molecules that will be trapped within the pores. Adsorption is in many situations a reversible process. The practice of removing volatiles from an adsorption media can be accomplished by reducing the pressure over the media, heating, or use of reduced pressure and heating. In either case the desired outcome is to re-volatilize the trapped vapors, and subsequently remove them from the adsorbent so that it can be reused to capture additional volatiles.

Traditional methods of heating adsorbent materials for the purpose of removing adsorbed volatiles that utilize conventional heating systems such as heated gas (air or inert gas), or radiant heat contact exchangers are inherently costly to construct, and are thermally less efficient. Systems that use preheated gas to transfer energy to an adsorbent mass are required to provide relatively large volumes of gas to achieve requisite thermal energy input. These devices typically need to have hot gas flows in excess of 25 standard cubic feet per cubic foot of adsorbent to effectively regenerate the adsorbent. Adsorbents, due to their inherent porosity, are usually poor conductors of heat, and thus, radiant contact heat exchanges must be designed to provide for very minimal distances between the heating plates, usually less than 1.25 inches. In many cases fabrication costs can be so excessive that this type of adsorbent regenerator can not be economically justified.

Accordingly, it would be desirable to provide a heating system and method for removing volatiles from adsorbent materials with higher thermal efficiency at a reduced cost.

The present disclosure provides for a microwave heating apparatus that removes volatiles from adsorbents. This heating apparatus is inclusive of the cylindrical vessel internal components, method of microwave radiation delivery, and design provisions that eliminate or minimize reflection of input microwave radiation back to the microwave power source of the apparatus. The vessel can include a first end that has been adapted to receive volatile containing adsorbent, and second end that has been adapted to remove adsorbent that has been rendered volatile free. The first end of the vessel can also provide a separate duct for the removal of evolved volatiles. Purge gas entry for volatile transport can be subsequently provided for in the second end of the vessel as a separate gas duct. The second end of the vessel can be provide for an enclosed channel that acts as a conduit for the introduction of electromagnetic energy into the vessel. A lateral waveguide can be included, and can be coupled to the radiation source. This mechanical array will thus allow radiation from the microwave power source to flow into the vessel.

The present disclosure can further provide a heating apparatus for removing volatiles from a saturated adsorbent. The heating apparatus can include a vessel that includes a first end adapted to receive the saturated adsorbent and a second end and a radiation system in communication with the second end of the vessel that generates energy to heat the saturated adsorbent. The vessel can include a dielectric material that absorbs the energy from the radiation system.

A heating apparatus for removing volatiles from a saturated adsorbent is also provided. The heating apparatus can include a vessel adapted to receive the saturated adsorbent and a channel coupled to the vessel. The heating apparatus can also include a radiation source in communication with the channel to provide energy to heat the vessel. The heating apparatus comprises a lateral waveguide coupled to the radiation source and disposed within the channel to transmit the energy from the radiation source to the vessel to heat the saturated adsorbent disposed within the vessel. The vessel can include a dielectric material that absorbs the energy from the radiation system.

Further areas of applicability will become apparent from the description provided herein. It should be understood that the description and specific examples are intended for purposes of illustration only and are not intended to limit the scope of the present disclosure.

DRAWINGS

The drawing described herein is for illustration purposes only and is not intended to limit the scope of the present disclosure in any way.

FIG. 1 is a schematic diagram of the microwave heating apparatus of the present disclosure.

DETAILED DESCRIPTION

The following description is merely exemplary in nature and is not intended to limit the present disclosure, application, or uses. Although the following description is related generally to a heating system for removing volatiles from a solid, micro-pore material or adsorbent, it will be understood that the microwave heating system, as described and claimed herein, can be used with any appropriate application where it would be useful to treat materials or objects with microwave radiation while maintaining a high thermal efficiency. Therefore, it will be understood that the following discussion is not intended to limit the scope of the appended claims.

With reference to FIG. 1, a microwave heating system 10 is shown. The microwave heating system 10 can irradiate a saturated material, such as a solid micro-pore adsorbent, to remove volatile materials from the saturated material. Irradiation of adsorbents with microwave radiation can provide an economical and thermally efficient alternative for heating adsorbent materials to remove adsorbed volatiles from the adsorbent. Microwave radiation energy can be applied to an adsorbent without heating a gas, and can effectively transfer thermal energy to specific adsorbents through path lengths in excess of 12 inches. To accomplish this method of heating the adsorbent, the apparatus for applying or generating the microwave radiation for a heating device must be constructed in such a manner as to afford uniform heating of the adsorbent, and to eliminate any reflection of the radiation back onto the microwave power source. The microwave heating system 10 can include a heating apparatus 12, a heating or radiation system 14, and a purge gas system 16. The heating apparatus 12 can be coupled to and in communication with the radiation system 14 for receipt of thermal energy generated by the radiation system 14, such as microwave radiation or electromagnetic energy, and with the purge gas system 16 for receipt of a purge gas to assist in the removal of volatiles from the adsorbent.

The heating apparatus 12 can include a chamber or vessel 17 and a lid 18. The lid 18 can be coupled to the vessel 17 to substantially enclose the vessel 17. The vessel 17 can generally be U-shaped; however, vessel 17 could also be rectangular, cylindrical or any other appropriate desired shape. The vessel 17 can be composed of a metal or metal alloy, such as steel, with a dielectric coating 19 or a dielectric member 19. It will be understood that as the dielectric coating and dielectric member are substantially similar, the reference number 19 as used herein will denote both the dielectric coating and the dielectric member. The use of the dielectric coating or dielectric member 19 can enable the conversion of any residual electromagnetic energy into heat or thermal energy. If a dielectric coating 19 is used, then the dielectric coating 19 can be applied to an interior surface 20 of the vessel 17. If a dielectric member 19 is used, the dielectric member 19 can be placed adjacent to the interior surface 20 of the vessel 17. The dielectric member 19 can comprise an annulus that can be disposed within the vessel 17 such that the adsorbent does not contact the interior surface 20 of the vessel 17, but rather, contacts the dielectric member 19.

Generally, the dielectric coating or dielectric member 19 can consist of an epoxy blended with a material with a high dielectric loss factor and a high temperature limit. For example, the epoxy can be composed of a first material composed of graphite, silicon carbide powder, alkaline silicate salts or other high dielectric loss factor materials, and blended with a high purity alumina- and/or silicate-based ceramic, glass or other thermally-stable polymer(s). If the dielectric coating 19 is used, then the dielectric coating 19 can be painted onto the interior surface 20 of the vessel 17. If the dielectric member 19 is used, then the dielectric member 19 can be formed into an annulus and placed within the vessel 17. The use of a high dielectric loss factor material can absorb the electromagnetic energy generated by the radiation system 14, while the use of a thermally-stable polymer can insulate the vessel 17 to aid in maintaining a high thermal efficiency in the vessel 17.

The use of a dielectric coating or dielectric member 19 with a high dielectric loss factor can reduce the reflection of the electromagnetic energy off the coated surface(s) of the vessel 17, thereby reducing the amount of electromagnetic energy that is reflected back to the radiation system 14. Thus, the use of an epoxy blended from a high dielectric loss factor material and a thermally-stable material can reduce the need for protective shielding on the radiation system 14, and can further reduce the reflection of the electromagnetic energy to approximately 0.03%. Alternatively, the vessel 17 could be formed of a material with a high dielectric loss factor, such as graphite, which can be blended with a thermally-stable material, such as a ceramic, before being cured into the desired shape for the vessel 17.

The vessel 17 can be generally symmetrical surrounding a vertical axis V, and can include a first end 26 and a second end 28. The first end 26 can include an apex 30. The apex 30 can be coupled to and in communication with the purge gas system 16, as will be described herein. In addition, the apex 30 can define a port 32 to enable the cleaned adsorbent to be discharged from the microwave heating system 10. The port 32 can include a main passage 34 to enable the cleaned adsorbent to exit the vessel 17, and can include a secondary passage 36 to enable purge gas to enter the vessel 17. The first end 26 can further define a horizontal or lateral channel 38 displaced a distance D from the apex 30. The channel 38 can be generally perpendicular to the vertical axis V. The channel 38 can define a first aperture 40 and a second aperture 42 to enable the radiation system 14 to be coupled to the heating apparatus 12, as will be discussed in greater detail herein.

The second end 28 of the vessel 17 can include an internal vessel or dome 44, and can define a surface for receipt of the lid 18. The dome 44 can be in communication with the radiation system 14 to receive the electromagnetic energy, as will be described in greater detail herein. The dome 44 can be composed of a thermally-stable material that is essentially transparent to electromagnetic energy, with a low-dielectric loss factor, such as a glass material (for example, Pyrex®, manufactured by Corning Incorporated, Corning, N.Y.), quartz, high purity alumina, or Teflon®, manufactured by DuPont, Wilmington, Del. The dome 44 can be formed to have a shape generally corresponding to the shape of the vessel 17 to enable the dome 44 to reside within the vessel 17. Thus, the dome 44 can be generally U-shaped, and can be symmetric with respect to the vertical axis V. The dome 44 can have a diameter D1, which can be slightly smaller than a diameter D2 of the vessel 17, to enable the dome 44 to reside within the vessel 17, and to enable the saturated adsorbent to pass between the dome 44 and the interior surface 20 of the vessel 17 via a channel defined between an outer surface of the dome 44 and the interior surface 20 of the vessel 17, as will be described in greater detail herein.

The dome 44 can include a first end or apex 46 and a second end 48. The dome 44 can receive the electromagnetic energy from the radiation system 14 substantially near the apex 46 of the dome 44, as will be described herein. The apex 46 of the dome 44 can be coupled to the radiation system 14 to prevent the adsorbent from contacting the radiation system 14. The apex 46 can be coupled to the dome 44 by any appropriate mechanism, such as by mechanical fasteners (bolts, screws, rivets, etc.) and/or adhesives. The second end 48 of the dome 44 can be configured to terminate substantially planar with the second end 28 of the vessel 17, such that both the second end 48 of the dome 44 and the second end 28 of the vessel 17 define a substantially level surface for receipt of the lid 18.

Thus, the vessel 17 can be composed of metal that is non-magnetic, and the dome 44 can form a non-metal annulus that can be mounted within the vessel 17 such that the non-metal annulus does not come in contact with the exterior surface 22 of the vessel 17 and enables the saturated adsorbent to flow between the interior surface 20 of the vessel 17 and the dome 44. The dome 44 or non-metal annulus can serve as a barrier to keep the adsorbent from coming into contact with the radiation system 14. The dome 44 can be constructed of materials that will not degrade from exposure to heat, and/or chemical vapors. Additionally, the dome 44 can be either coated with or impregnated with chemically inert and thermally stable compounds and/or elements that will render the dome 44 totally or partially adsorptive to microwave radiation. Examples of, but not exclusive to, these compounds that can be applied to or impregnated into the dome 44 can include: graphite, silicon carbide, alkaline silicate salts, and alkaline hydroxides, etc.

The lid 18 can be coupled to the second end 28 of the vessel 17 and the second end 48 of the dome 44. The lid 18 can include a first surface or member 50, a second surface or member 52, and a throughbore or port 54 for receipt of the saturated adsorbent. The lid 18 can be coupled to the vessel 17 via fasteners F disposed in at least one or a plurality of apertures (not specifically shown) defined in the first member 50 and the second member 52. The fasteners F can comprise a screw with a nut; however, any suitable mechanism could be used to couple the first member 50 and second member 52 together, such as adhesives, welding, etc.

The first member 50 can be configured to mate with the second end 48 of the dome 44, and can be a ceramic disk with a diameter, which can be greater than the diameter D1 of the dome 44. The first member 50 can include the dielectric coating 19 to convert the electromagnetic energy reflected onto the first member 50 into thermal energy, as discussed previously. The use of the dielectric coating 19 on the first member 50 further reduces the amount of electromagnetic energy reflected back to the radiation system 14, and further improves the thermal efficiency of the vessel 17. The first member 50 can further define an aperture 60 for receipt of the port 54 therethrough. The first member 50 can be coupled to and can be sandwiched between the second member 52 via any appropriate technique, such as mechanical fasteners, adhesives, bonding, etc.

The second member 52 can generally have a diameter, which is substantially equivalent to or greater than the diameter D2 of the vessel 17. The second member 52 can generally be an annular steel plate; however, the second member 52 could be formed from any suitable metal or metal alloy. The second member 50 can comprise two members 50 that can sandwich the first member 52 therebetween, if desired. The second member 52 can also define an aperture 62 for receipt of the port 54 therethrough.

The second member 52 can generally have a diameter, which is substantially equivalent to the diameter D2 of the vessel 17. The second member 52 can generally be an annular steel plate; however, the second member 52 could be formed from any suitable metal or metal alloy. The second member 52 can also define an aperture 62 for receipt of the port 54 therethrough.

The port 54 can be received in the aperture 60 of the first member 50 and the aperture 62 of the second member 52 to enable saturated adsorbent to enter the vessel 17, while enabling purge gas to exit the vessel 17, as will be discussed in greater detail herein. The port 54 generally defines a main passage 64 and a secondary passage 66. The main passage 64 can be configured for receipt of the saturated adsorbent to enable the saturated adsorbent to enter into the vessel 17. The secondary passage 66 can be configured to be coupled to the purge gas system 16 to enable purge gas to exit the vessel 17. It will be understood that the port 54 can include various valves, and could further include fittings as needed to enable the purge gas system 16 to be coupled to the port 54 and the saturated adsorbent to be received within the port 54.

The radiation system 14 can include a radiation source 68 coupled to and in communication with a waveguide 70 for transmitting electromagnetic energy to a mode converter 72. The radiation source 68 can be a generator or any other device suitable of emitting electromagnetic energy, such as a transmitter. Generally, the radiation source 68 can be a microwave generator or transmitter emitting microwave energy at a selected range. An output 74 of the radiation source 68 can be coupled to the waveguide 70.

The waveguide 70 can be generally rectangular; however, it can have any shape as desired to mate with the channel 38 of the vessel 17. The waveguide 70 can be composed of any material, but can generally be composed of a reflective material. The waveguide 70 can have a first end 76 coupled to the radiation source 68, and a second end 78 configured to receive the mode converter 72. Generally, a length of the waveguide 70 can be smaller than a length of the channel 38, and a width of the waveguide 70 can be such that the waveguide 70 can be received in the first aperture 40, and thus, the channel 38. The second end 78 can generally be adjacent to the second aperture 42 of the channel 38 of the vessel 17 when the waveguide 70 is fully received in the channel 38, so that the mode converter 72 can transmit electromagnetic energy into the vessel 17, and can be protected by the dome 44.

The mode converter 72 can be in communication with and/or coupled to the waveguide 70. The mode converter 72 can receive the electromagnetic energy from the radiation source 68 through the waveguide 70 and transmit converted electromagnetic energy to the vessel 17, while being protected from contact with the saturated adsorbent by the dome 44. The mode converter 72 can also include a bracket (not shown) to mechanically couple the dome 44 to the mode converter 72.

The purge gas system 16 can include a gas supply 80 coupled to the secondary passage 36 of the port 32 of the vessel 17 and the secondary passage 66 of the port 54 of the lid 18. The secondary passage 36 of the port 32 of the vessel 17 can comprise an inlet for the purge gas, and the secondary passage 66 of the port 54 of the lid 18 can comprise an outlet for the purge gas. The gas supply 80 can supply a controlled gas to accelerate the removal of volatiles from the saturated adsorbent. In this regard, the purge gas can be used to trap the volatiles from the saturated adsorbent, and the volatile containing purge gas can be transmitted to a separate receptacle (not shown). The purge gas can also serve to cool the adsorbent disposed within the vessel 17, and can enable the cleaned adsorbent to exit the vessel 17 at a temperature that ranges from about 80° Fahrenheit to about 110° Fahrenheit. The purge gas system 16 can also include a fan 82 to aid in the circulation of the purge gas.

In order to remove volatiles from a saturated adsorbent, the saturated adsorbent can enter the vessel 17 through the port 54 of the lid 18. The saturated adsorbent can enter into a space defined between the dome 44 and the interior surface 20 of the vessel 17. Substantially simultaneously, the radiation source 68 can be energized to emit electromagnetic energy. The electromagnetic energy from the radiation source 68 can be transmitted through the waveguide 70 to the mode converter 72. The mode converter 72 can then transmit the electromagnetic energy through the second aperture 42 of the channel 38 into the second end 28 of the vessel 17 and into the dome 44. The electromagnetic energy can then pass through the dome 44 to heat the saturated adsorbent disposed between the dome 44 and the interior surface 20 of the vessel 17. The electromagnetic energy can then contact the dielectric coating or dielectric member 19 disposed on the interior surface 20 of the vessel 17. The dielectric coating or dielectric member 19 can absorb the electromagnetic energy to prevent the reflection of the electromagnetic energy back onto the radiation system 14. The absorption of the electromagnetic energy can also create additional heat, which can be used to further heat the saturated adsorbent.

During the operation of the radiation system 14, the purge gas system 16 can be energized to accelerate the removal of volatiles from the saturated adsorbent. The gas supply 80 can provide the purge gas through the secondary passage 36 of the port 32 of the vessel 17. The fan 82 can then be used to drive the flow of the purge gas from the first end 26 of the vessel 17 to the second end 28 of the vessel 17, around the dome 44, until the purge gas exits through the secondary passage 66 of the port 54 of the lid 18. After passing around the dome 44, the saturated adsorbent can exit the vessel 17 though the main passage 34 of the port 32 of the vessel 17.

Thus, the present application can provide a heating system and method for removing volatiles from adsorbent materials with higher thermal efficiency at lower costs. In this regard, the use of the vessel 17 with the dielectric coating or dielectric member 19 can prevent damage to the radiation source 68 by adsorbing any reflected electromagnetic energy, while also generating additional heat. Further, the arrangement of the radiation source 68 and waveguide 70 with respect to the vessel 17 can create a thermally efficient heating system that can obtain a thermal efficiency between about 90 percent to about 99.5 percent, such as about 93 percent to about 98.5 percent, since the electromagnetic energy can flow substantially directly into the vessel 17.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A heating apparatus for removing volatiles from a saturated adsorbent comprising:
    a vessel including a first end and a second end, the vessel adapted to receive the saturated adsorbent;
    an internal vessel disposed within the vessel that defines a channel between the vessel and the internal vessel to enable the saturated adsorbent to pass between the vessel and the internal vessel;
    a second channel in communication with the first end of the vessel;
    a radiation source that provides energy to heat the vessel; and
    a lateral waveguide coupled to the radiation source and disposed within the second channel to transmit the energy from the radiation source to the vessel to heat the saturated adsorbent disposed within the vessel.

2. The heating apparatus of claim 1, wherein the internal vessel comprises a dome disposed within the vessel adjacent to the second end of the vessel that protects the radiation source from contact by the saturated adsorbent, and the vessel further comprises:
    a port coupled to the first end that enables cleaned adsorbent to exit the vessel.

3. The heating apparatus of claim 2, wherein the dome extends from the second end to the first end of the vessel, and the dome is composed of a material that has a low dielectric loss factor.

4. The heating apparatus of claim 3, wherein the vessel includes an interior surface and an exterior surface, the dome disposed adjacent to the interior surface, and with a dielectric material disposed between the dome and the interior surface of the vessel, the dielectric material selected from the group comprising at least one of graphite, silicon carbide powder, alkaline silicate salts, ceramic, and combinations thereof.

5. The heating apparatus of claim 4, wherein the dielectric material comprises an annulus disposed within the vessel between the interior surface of the vessel and the dome.

6. The heating apparatus of claim 2, wherein the port defines at least one passage that enables at least one of a purge gas to enter the vessel and the cleaned adsorbent to exit the vessel.

7. The heating apparatus of claim 6, further comprising a lid coupled to at least one of the dome and the vessel, wherein the lid further comprises:
    a first member that mates with the dome to enclose a second end of the dome;
    a second member that mates with the vessel to enclose the second end of the vessel;
    a port received through the first member and the second member to enable at least one of the saturated adsorbent to enter the vessel and the purge gas to exit the vessel; and
    wherein the first member includes a dielectric material that absorbs the energy from the radiation source.

8. The heating apparatus of claim 2, further comprising:
    a mode converter disposed in the second channel and in communication with the waveguide to transmit the energy from the lateral waveguide to the saturated adsorbent; and
    wherein the mode converter is coupled to the dome to prevent adsorbent from contacting the mode converter.

9. A heating apparatus for removing volatiles from a saturated adsorbent comprising:
    a vessel including a first end adapted to receive the saturated adsorbent and a second end;
    a dome disposed within the vessel adjacent to the second end of the vessel that protects the radiation system from contact by the saturated adsorbent and defines a channel between the vessel and the dome to enable the saturated adsorbent to pass between the vessel and the dome;
    a port coupled to the first end that enables cleaned adsorbent to exit the vessel; a radiation system in communication with the second end of the vessel that generates energy to heat the saturated adsorbent; and
    wherein the vessel includes a dielectric material that absorbs the energy from the radiation system.

10. The heating apparatus of claim 9, wherein the dome extends from the second end to the first end of the vessel, and the dome is composed of a material with a low dielectric loss factor.

11. The heating apparatus of claim 10, wherein the vessel includes an interior surface and an exterior surface, the dome disposed adjacent to the interior surface and the dielectric material is disposed between the dome and the interior surface of the vessel, with the dielectric material selected from the group comprising at least one of graphite, silicon carbide powder, alkaline silicate salts, ceramic, and combinations thereof.

12. The heating apparatus of claim 11, wherein the dielectric material comprises an annulus disposed within the vessel between the interior surface of the vessel and the dome.

13. The heating apparatus of claim 12, further comprising a lid coupled to at least one of the dome and the vessel, wherein the lid further comprises:
    a first member that mates with the dome to enclose a second end of the dome;

a second member that mates with the vessel to enclose the second end of the vessel;

a port received through the first member and the second member to enable at least one of the saturated adsorbent to enter the vessel and the purge gas to exit the vessel; and wherein the first member includes a dielectric material that absorbs the energy from the radiation source.

14. The heating apparatus of claim 9, wherein the port defines at least one passage that enables at least one of a purge gas to enter the vessel and the cleaned adsorbent to exit the vessel.

15. The heating apparatus of claim 9, wherein the radiation system further comprises:

a second channel in communication with the first end of the vessel;

a radiation source in communication with the second channel that provides energy to heat the vessel;

a lateral waveguide in communication with the radiation source and disposed in the second channel to receive the energy from the radiation source;

a mode converter disposed in the channel and in communication with the waveguide to transmit the energy from the lateral waveguide to the vessel to heat the saturated adsorbent disposed within the vessel; and wherein the mode converter is coupled to the dome to prevent adsorbent from contacting the mode converter.

16. A heating apparatus for removing volatiles from a saturated adsorbent comprising:

a vessel adapted to receive the saturated adsorbent;

a dome disposed within the vessel adjacent to the second end of the vessel that protects the radiation source from contact by the saturated adsorbent and defines a channel between the vessel and the dome to enable the saturated adsorbent to pass between the vessel and the dome;

a second channel coupled to the vessel;

a radiation source in communication with the second channel to provide energy to heat the vessel;

a lateral waveguide coupled to the radiation source and disposed within the second channel to transmit the energy from the radiation source to the vessel to heat the saturated adsorbent disposed within the vessel; and wherein the vessel includes a dielectric material that absorbs the energy from the radiation system.

17. The heating apparatus of claim 16, wherein the vessel has a first end and a second end, and further comprises:

a port coupled to the first end that defines at least one passage that enables at least a purge gas to enter the vessel or the cleaned adsorbent to exit the vessel; and wherein the vessel includes an interior surface and an exterior surface, with the dome disposed adjacent to the interior surface so that the saturated adsorbent passes between the dome and the inner surface of the vessel, and the dielectric material is disposed between the dome and the interior surface of the vessel, with the, dielectric material selected from the group comprising at least one of graphite, silicon carbide powder, alkaline silicate salts, ceramic, and combinations thereof.

18. The heating apparatus of claim 17, further comprising a lid coupled to at least one of the dome and the vessel that further comprises:

a first member that mates with the dome to enclose a second end of the dome;

a second member that mates with the vessel to enclose the second end of the vessel;

a port received through the first member and the second member to enable at least one of the saturated adsorbent to enter the vessel and the purge gas to exit the vessel; and wherein the first member includes a dielectric material that absorbs the energy from the radiation source.

19. The heating apparatus of claim 16, further comprising:

a mode converter disposed in the second channel and in communication with the waveguide to transmit the energy from the lateral waveguide to the saturated adsorbent; and wherein the mode converter is coupled to the dome to prevent adsorbent from contacting the mode converter.

* * * * *